(12) United States Patent
Eirmbter

(10) Patent No.: US 9,968,022 B2
(45) Date of Patent: May 15, 2018

(54) PIVOTING SUPPORT WHEEL FOR A REVERSIBLE PLOUGH

(71) Applicant: LEMKEN GmbH & Co. KG, Alpen (DE)

(72) Inventor: Sebastian Eirmbter, Willich (DE)

(73) Assignee: LEMKEN GmbH & Co. KG, Alpen (DE)

( * ) Notice: Subject to any disclaimer, the term of this patent is extended or adjusted under 35 U.S.C. 154(b) by 123 days.

(21) Appl. No.: 14/901,134

(22) PCT Filed: Jun. 27, 2014

(86) PCT No.: PCT/DE2014/100218
§ 371 (c)(1),
(2) Date: Dec. 28, 2015

(87) PCT Pub. No.: WO2014/206401
PCT Pub. Date: Dec. 31, 2014

(65) Prior Publication Data
US 2016/0150715 A1    Jun. 2, 2016

(30) Foreign Application Priority Data

Jun. 28, 2013 (DE) .................. 10 2013 106 783

(51) Int. Cl.
*A01B 63/00* (2006.01)
*A01B 3/46* (2006.01)
*A01B 3/28* (2006.01)
*A01B 15/20* (2006.01)

(52) U.S. Cl.
CPC .............. *A01B 63/008* (2013.01); *A01B 3/28* (2013.01); *A01B 3/464* (2013.01); *A01B 15/20* (2013.01)

(58) Field of Classification Search
CPC ......... A01B 63/008; A01B 3/28; A01B 3/464; A01B 15/20
See application file for complete search history.

(56) References Cited

U.S. PATENT DOCUMENTS

| | | | | |
|---|---|---|---|---|
| 492,821 | A * | 3/1893 | Myers ................. | A01B 17/004 172/161 |
| 679,489 | A * | 7/1901 | Wiebe ................. | A01B 17/004 172/161 |
| 865,294 | A * | 9/1907 | Clark .................. | A01B 5/14 172/161 |
| 1,517,086 | A * | 11/1924 | Mattice ............... | A01B 3/18 172/149 |
| 1,521,895 | A * | 1/1925 | Logan ................. | A01B 3/28 172/161 |
| 2,298,553 | A * | 10/1942 | Ego .................... | A01B 63/18 172/411 |

(Continued)

FOREIGN PATENT DOCUMENTS

DE    2421373 A1    11/1975
DE    2554273 A1    6/1977
(Continued)

*Primary Examiner* — Jamie L McGowan
(74) *Attorney, Agent, or Firm* — James Creighton Wray; Meera P. Narasimhan

(57) ABSTRACT

A swivelling support wheel for a reversible plough is proposed that is adjusted with a toothed segment and a catch and gives the working depth of the ploughing tools.

8 Claims, 3 Drawing Sheets

(56) References Cited

U.S. PATENT DOCUMENTS

| | | | | | |
|---|---|---|---|---|---|
| 2,329,193 | A | * | 9/1943 | Frank | A01B 63/166 172/411 |
| 2,364,367 | A | * | 12/1944 | Janke | A01B 3/42 172/161 |
| 2,609,740 | A | * | 9/1952 | Dexheimer, Jr. | A01B 3/421 172/161 |
| 2,860,563 | A | * | 11/1958 | Zahn | A01B 3/42 172/212 |
| 2,900,033 | A | * | 8/1959 | Coviello | A01B 5/14 172/212 |
| 2,943,688 | A | * | 7/1960 | Cox | A01B 3/464 172/212 |
| 3,106,971 | A | * | 10/1963 | Bushmeyer | A01B 3/26 172/385 |
| 3,233,680 | A | * | 2/1966 | Arzoian | A01B 63/114 172/4 |
| 3,700,043 | A | * | 10/1972 | Sullivan | A01B 3/46 172/400 |
| 4,375,837 | A | * | 3/1983 | van der Lely | A01B 29/048 172/481 |

FOREIGN PATENT DOCUMENTS

| | | |
|---|---|---|
| DE | 7538474 U | 2/1980 |
| DE | 102006039513 A1 | 5/2007 |

* cited by examiner

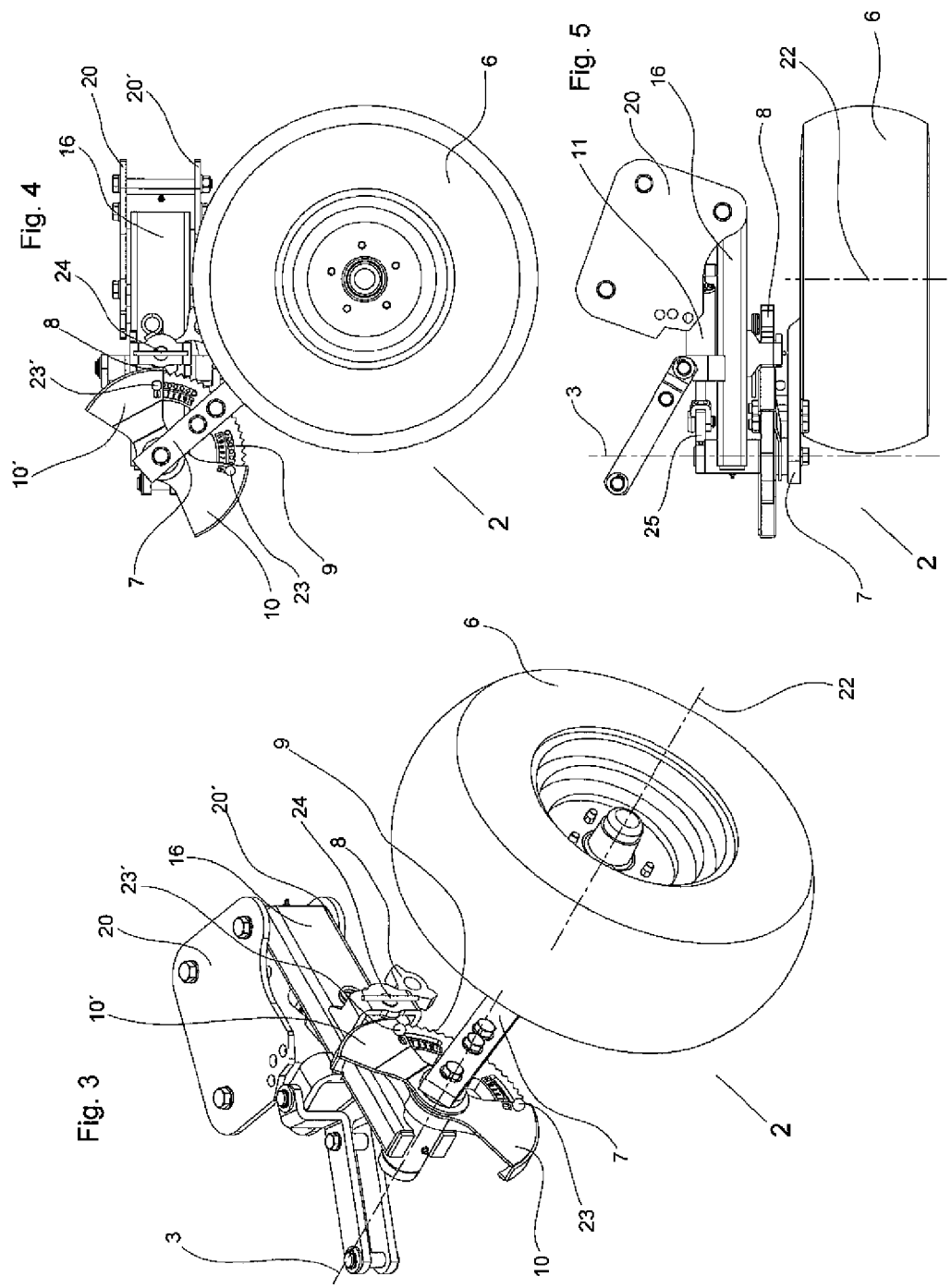

PIVOTING SUPPORT WHEEL FOR A REVERSIBLE PLOUGH

This application claims the benefit of German Application No. 10 2013 106 783.2 filed Jun. 28, 2013 and PCT/DE2014/100218 filed Jun. 27, 2014, International Publication No. WO 2014/206401, which are hereby incorporated by reference in their entirety as if fully set forth herein.

The invention proposes a swivelling support wheel for a reversible plough in accordance with the generic concept of patent claim 1.

Reversible ploughs, not only large semimounted ploughs, but also mounted reversible ploughs in particular, are usually equipped with swivelling support wheels to limit the depth of the ploughing tools. The ploughing tools attached in pairs opposite the plough frame turn the soil in one direction. After passing over the field to be ploughed, the reversible plough is turned by 180 degrees around its frame axis, in order to obtain a furrow connection and an even ploughed surface on the field on the return over the field to be ploughed. Through this plough turning operation, the swivelling support wheel also rotates into a deeper position opposite the plough frame, in order to limit the working depth of the ploughing tools on the return. The working depth is usually given by the swivelling angle of the support wheel. Mechanical limits in the form of stop spindles, bolt stoppers, etc., have become familiar here. However, because of the dynamic properties of the swivelling operation, these solutions are often susceptible to failure and cannot always guarantee the secure setting of a plough working depth. A device of this type is described in the German utility model DE 75 38 474 U1. In order to stop the support wheel swivelling forwards when the plough is placed down, the forward swivelling movement of the wheel is prevented with a catch or through displacement of the wheel's centre of gravity. The backwards swivelling movement in the working position is restricted with an adjustable stopper for the depth setting of the plough. On the same day a further solution is proposed in DE 25 54 273 C2 in which the rotatability of the support wheel around its running axis in a vertical position of the support wheel holder is prevented by a brake device. Through the braked wheel, on a forward movement of the plough the support wheel swivels to the rear and is restricted as described above with an adjustable stopper for the depth setting of the plough. Hydraulic limiting devices for the swivelling angle of the support wheel are also known. A comfortable and functionally safe solution is described, for example, in the German application documents DE 10 2006 039 513 A1. However, because of the expensive hydraulic components, this solution tends to be preferred by comfort-conscious users.

The task of the invention is therefore to supply a low-cost and functionally safe swivelling support wheel that has a compact design and is easy to assemble from a few parts.

This task is solved through the features of the characterising part of claim 1.

Because the swivelling support wheel falls from a higher position into the lowest possible position when the raised reversible plough is rotated around its rotating gear axis, as a result of its arrangement the catch slides over the recesses of the toothed segment and the contour of the cover into an end position. After the plough is lowered into the working position of the ploughing tools, the support wheel is supported on the ground and the swivelling support wheel swivels back in the opposite position in the direction of the frame. In doing this, the catch slides up to the end of the contour of the cover and falls through its own weight into the first possible and therefore effective recess of the toothed segment behind the end of the contour of the cover. A further swivelling movement of the swivelling support wheel is limited in this way. Depending on how far the cover covers a part of the toothed segment, the catch falls into a selected recess of the toothed segment and enables differently adjustable swivelling angles of the swivelling support wheel and thus simple adjustment of the working depth of the ploughing tools. This cover can be changed by adjusting the position of the cover to the toothed segment.

Because the cover of the toothed segment can be altered by adjusting the position of the cover plate to the toothed segment, this permits a variable setting of the respective effective or non-effective area by enabling or preventing the fall of the catch into a corresponding recess.

In a special implementation of the invention, the toothed segment is assigned to a part of the plough frame and the catch to the swivelling support wheel. This arrangement of the components achieves a simple construction of the device, which is not impaired in its function through falling harvest residues and clumps of earth during the turning procedure of the reversible plough Another version of the invention provides that the catch is assigned to a part of the plough frame and the toothed segment to the swivelling support wheel. This construction achieves a very compact arrangement of the cover plate over the toothed segment.

In a particular implementation of the invention, the effective length of the catch or the effective clearance of the catch is designed to be adjustable towards the toothed segment. Through this adjustability, a further and even more precise adjusting possibility of the swivelling angle of the swivelling support wheel is enabled beyond the angular pitch of the recesses of the toothed segment.

It is also to be regarded as advantageous if the swivelling speed of the swivelling support wheel is limited by a damping device. The durability of the device is improved in particular on rapid turning procedures of the reversible plough.

In a special implementation of the invention, the movement of the catch or the positive interplay of the catch with the toothed segment is supported by an energy storage device or by external power. Through the employment of an energy storage device, such as, for example, a spring, a magnet or other elastic adjusting elements, the functional safety of the device is guaranteed still more, even on slopes and with driving dynamics influences. Switchable devices with external power, such as fluid cylinders and magnetic or electric motor equipment, are also conceivable. These can also be actively actuated by a control unit, for example in dependence on the swivelling operation or other signals.

In an implementation of the invention that goes still further, the wheel blade and the support wheel is designed to be rotatable with another swivelling device in the lengthways axis of the wheel blade at an angle of approximately 90°. Through this arrangement, the swivelling support wheel takes over the function of a transport wheel, which supports part of the plough's weight during transport as a trailing star wheel in a middle, blocked swivelling position of the reversible plough.

The invention is characterised in particular in that a swivelling support wheel is created that is easy to fit and is assembled at low cost from just a few parts, which enables a variable, finely adjustable depth guide of a reversible plough through a catch in operative connection with a toothed segment and can be comfortably adjusted through movable cover plates.

Further details and advantages of the object of the invention can be seen in the following description and the associated drawings, in which a design example with the necessary details and individual parts is shown.

DETAILED DESCRIPTION OF THE DRAWINGS

Figure 1:
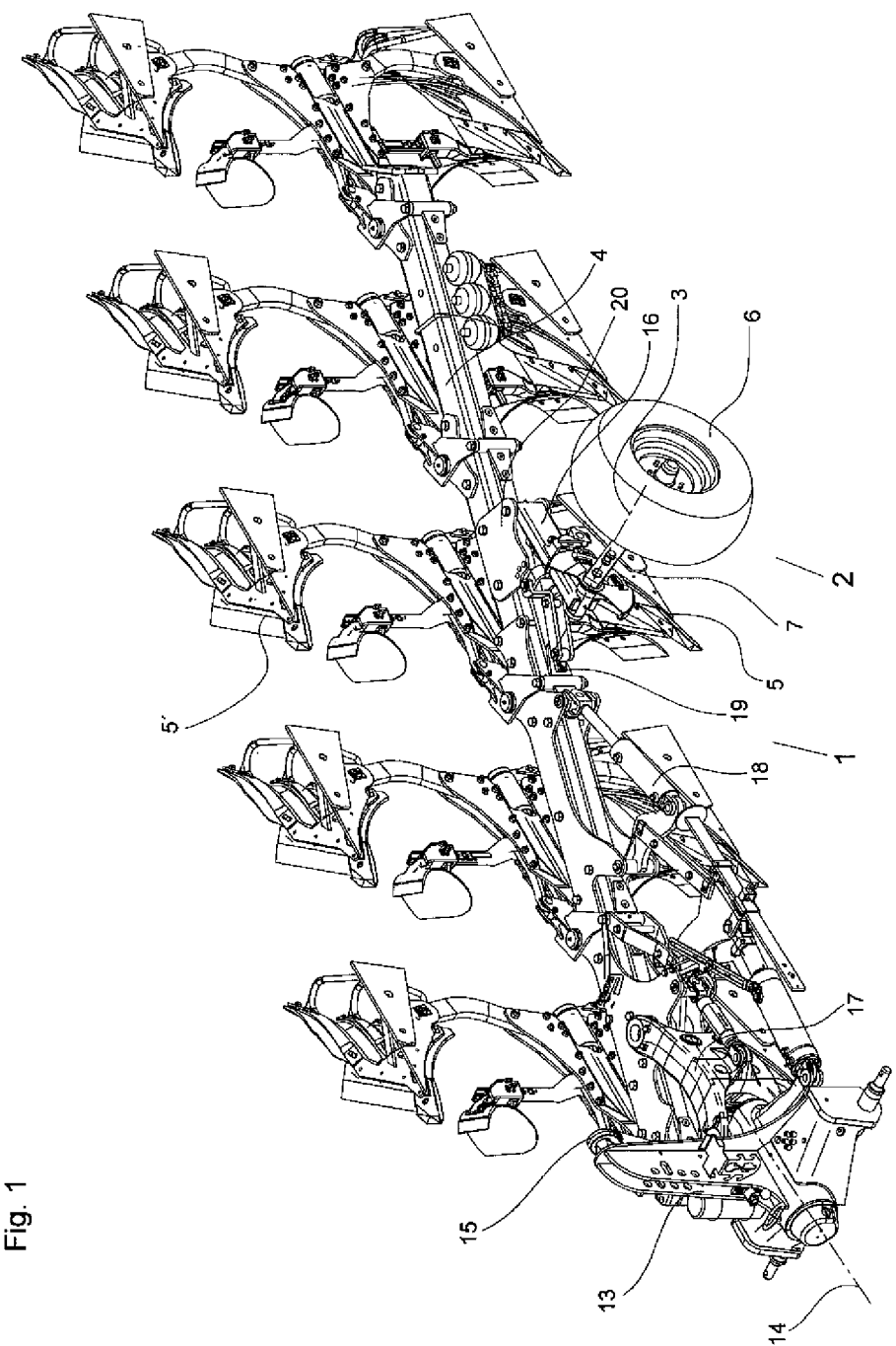
FIG. 1 Shows a perspective view of a mounted reversible plough whose working width can be adjusted, FIG. 2 Shows a side view of a mounted reversible plough, FIG. 3 Shows a perspective view of a swivelling support wheel, FIG. 4 Shows the swivelling support wheel from the left side in the direction of travel, and FIG. 5 Shows a top view of the swivelling support wheel.

FIG. 1 shows a reversible plough 1 whose working width can be adjusted for mounting on a tractor's three-point hydraulic system. When this is done, the lower link arm and the upper link arm of the three-point hydraulic system must be connected to the mounting rotating turret 13. The tractor can lift the complete plough above the ground or lower it to the working depth of the ploughing tools 5 by means of the three-point hydraulic system. The plough frame 4 with its ploughing tools 5 is connected to the mounting rotating turret 13 rotatable around the turning shaft 14. A turning cylinder 15, which is connected hinged to the mounting rotating turret 13 and engages at a lever laterally to the turning shaft 14, can swivel the plough frame 4 with its individual parts, the ploughing tools 5 and the swivelling support wheel 2 jointly from a left turning position by approx. 180 degrees to a right turning position and vice versa. The plough frame 4 is connected to the turning shaft 14 by a steering rod 17 and adjusters. The plough frame can be swivelled with the hydraulic cylinder 18 at an angle to the turning shaft. In this way, the cutting width of the ploughing tools 5 guided with a rod 19 parallel to the direction of travel 12 can be adjusted. In the top view, the support wheel bracket 16 is fastened swivelling to the plough frame 4 by means of two frame plates 20, 20' and is also guided via the rod 19 approximately parallel to the direction of travel 12 and the ploughing tools 5. Again, the wheel blade 7 of the swivelling support wheel 2 is mounted rotatable around the swivelling shaft 3 via a pin in a bearing provided for this in the support wheel bracket 16 and when the reversible plough is lifted or lowered its weight causes it always to fall into the deepest possible position limited by stoppers. The support wheel 6 is mounted rotatable at the other end of the wheel blade 7.

Figure 2:
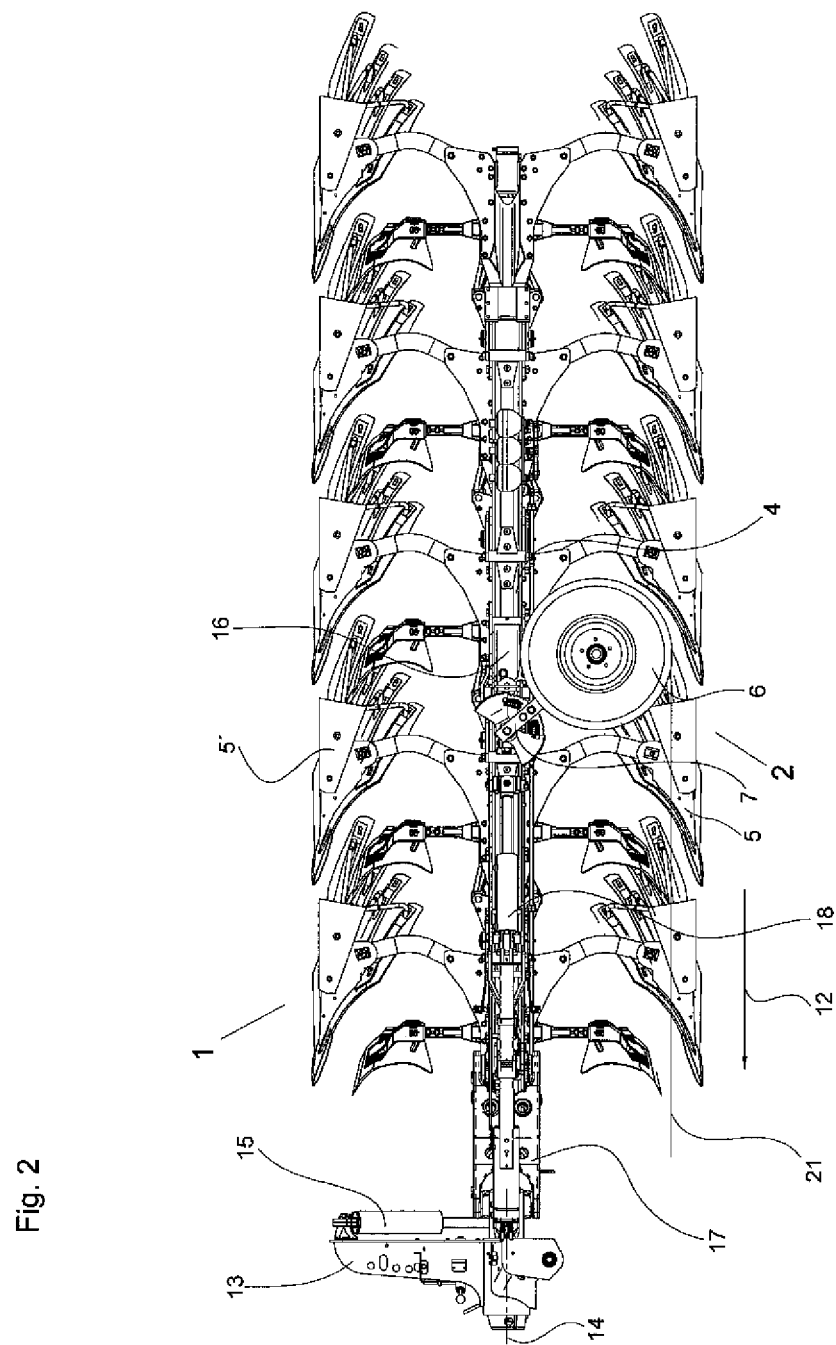

FIG. 2 shows a side view of the reversible plough 1 in direction of travel 12 seen from the left side. The figure shows the mounting rotating turret 13 for coupling at the tractor's three-point hydraulic system as well as the rotatable turning shaft 14 and the turning cylinder 15 then engages here via a lever. The steering rod 17 connects the plough frame 4 with the turning shaft 14. The ploughing tools 5 and the swivelling support wheel 2 are mounted on the plough frame via support wheel bracket 16. The swivelling support wheel 2 is shown here in the working position and supports itself on the ground 21 with its support wheel 6 and in this way sets the working depth of the ploughing tools 5 together with the wheel blade 7, the toothed segment 9 and the catch 8.

The adjustment of the working depth and the limit of the swivelling angle of the swivelling support wheel 2 can be seen in FIG. 3. The wheel blade 7 is rotatable around the swivelling shaft 3 in the support wheel bracket 16. The frame plates 20, 20' connect the support wheel bracket 16 with the plough frame 4 from FIG. 1 and FIG. 2. The support wheel 6 is rotatable at the lower end of the wheel blade 7. The bearing shaft 22 is aligned parallel to the swivelling shaft 3 and approximately vertically to the direction of travel 12. Screwed tightly to the wheel blade 7 the toothed segment 9 swivels with its gearing concentrically around the swivelling shaft 3. Two cover plates 10, 10' are positioned movably around the swivelling shaft 3 between the toothed segment 9 and the wheel blade 7. The cover plates are adjustably locked relative to the toothed segment through springloaded locking bolts 23 and cover part of the gearing of the toothed segment. The catch 8 is connected easily rotatable to the support wheel bracket with a bolt 24. Through its layout, the catch 8 drops through gravity. If the reversible plough is now raised or reversed, the swivelling support wheel 2 drops down. The wheel blade 7 moves the toothed segment 9 and the cover plates 10, 10'. When this is done, the gearing of the toothed segment 9 and the outer surface of the cover plate 10' slide as with a ratchet past the gravity-loaded corner of the catch 8. If the reversible plough is now lowered again, the support wheel 6 comes into contact with the ground. The wheel blade 7, the toothed segment 9 and the cover plates 10, 10' move in an opposed direction. The catch now slides over one of the cover plates 10, 10' until its end and then drops safely and positively into the first possible recess of the toothed segment 9. The swivelling support wheel 2 is now fixed in an upward movement and sets the working depth of the reversible plough reproducibly. When the reversible plough is turned, the procedure takes place mirror symmetrically with the other cover plate 10', 10. If the locking bolt 23 of the cover plate 10, 10' is pulled manually, the cover plate 10, 10' can be moved relative to the toothed segment 9 and exposes various tooth recesses into which the catch 8 drops first. In this way, the swivelling angle of the swivelling support wheel 2 is adjustable, and with it the working depth of the reversible plough r.

FIG. 4 shows the layout in FIG. 3 in a side view from the left. It can clearly be seen how the catch 8 is rotatable around the bolt 24 and with its external edge drops into the toothed segment 9 immediately behind the lower end of the cover plate 10' and prevents this, and thus the associated wheel blade 7 and the support wheel 6, from swivelling up further.

FIG. 5 shows the same layout as FIG. 3 and FIG. 4 in a top view. A damping device 11 is attached to the side of the support wheel bracket 16 opposite the wheel blade 7, which is supported on the support wheel bracket 16 and engages at a lever 25 that is connected tightly to the wheel blade 7 through the swivelling shaft 3 and limits the swivelling speed during the turning procedure of the reversible plough 1.

The invention is not limited to the examples shown and described here. Semimounted ploughs equipped with a different chassis and fixed ploughs whose width cannot be adjusted in other configurations are conceivable.

The invention claimed is:

1. Swivelling support wheel (2) for a reversible plough (1), comprising the swivelling support wheel connected with the plough frame (4) of the reversible plough (1) rotatably around a swivelling shaft (3) that runs at least approximately parallel to the ground and at least approximately perpendicular to the direction of travel, the reversible plough (1) including ploughing tools (5) being adjustable from a right turning into a left turning position, a support wheel (6)

mounted rotatably on a wheel blade (7) forming the swivelling support wheel (2) and together limiting a working depth of the ploughing tools (5) through contact with the ground, wherein a swivelling angle of the swivelling support wheel (2) to the plough frame (4) is limited, the swivelling support wheel (2) being rotatable in a raised position of the reversible plough (1) for the lowest swivelling position when the reversible plough (1) is lowered into a working position, whereby the working position is given by at least one movable catch (8), said movable catch (8) dropping into a recess of a single-part or multi-part toothed segment (9) for positively limiting the swivelling angle of the swivelling support wheel (2), and wherein the toothed segment (9) is operatively divided towards the catch (8) by at least one cover (10, 10') into an effective and a non-effective area.

2. Swivelling support wheel for a reversible plough in accordance with claim 1, wherein the cover of the toothed segment (9) can be varied by adjusting the position of the cover (10, 10') to the toothed segment (9).

3. Swivelling support wheel for a reversible plough in accordance with claim 1, wherein the toothed segment (9) is assigned to a part of the plough frame (4) and the catch (8) to the swivelling support wheel (2).

4. Swivelling support wheel for a reversible plough in accordance with claim 1, wherein the catch (8) is assigned to a part of the plough frame (4) and the toothed segment (9) to the swivelling support wheel (2).

5. Swivelling support wheel for a reversible plough in accordance with claim 1, wherein the effective length of the catch (8) or the effective clearance of the catch (8) is designed to be adjustable towards the toothed segment (9).

6. Swivelling support wheel for a reversible plough in accordance with claim 1, wherein the swivelling speed of the swivelling support wheel (2) is limited by a damping device (11).

7. Swivelling support wheel for a reversible plough in accordance with claim 1, wherein the movement of the catch (8) or the positive interplay of the catch (8) with the toothed segment (9) is supported by an energy storage device or by external power.

8. Swivelling support wheel for a reversible plough in accordance with claim 1, wherein the wheel blade (7) and the support wheel (6) are designed to be rotatable along a second axis of the wheel blade (7) at an angle of approximately 90°.

* * * * *